(12) United States Patent
Kim et al.

(10) Patent No.: US 12,316,120 B2
(45) Date of Patent: May 27, 2025

(54) POWER DISTRIBUTION DEVICE AND METHOD USING DROOP CONTROL

(71) Applicant: LG ENERGY SOLUTION, LTD., Seoul (KR)

(72) Inventors: Jongcheol Kim, Daejeon (KR); Hyeungil Jo, Daejeon (KR); Inho Jung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 139 days.

(21) Appl. No.: 18/024,192

(22) PCT Filed: May 19, 2022

(86) PCT No.: PCT/KR2022/007166
§ 371 (c)(1),
(2) Date: Mar. 1, 2023

(87) PCT Pub. No.: WO2022/270769
PCT Pub. Date: Dec. 29, 2022

(65) Prior Publication Data
US 2023/0275437 A1    Aug. 31, 2023

(30) Foreign Application Priority Data
Jun. 23, 2021  (KR) .................. 10-2021-0081702

(51) Int. Cl.
| | | |
|---|---|---|
| *H02J 3/32* | (2006.01) | |
| *H02J 3/12* | (2006.01) | |
| *H02M 3/158* | (2006.01) | |

(52) U.S. Cl.
CPC ................... *H02J 3/32* (2013.01); *H02J 3/12* (2013.01); *H02M 3/158* (2013.01)

(58) Field of Classification Search
CPC ............... H02J 3/32; H02J 3/12; H02M 3/158
See application file for complete search history.

(56) References Cited

U.S. PATENT DOCUMENTS

| | | | |
|---|---|---|---|
| 10,707,679 B2 * | 7/2020 | Lehn ..................... | H02J 3/32 |
| 2015/0214754 A1 | 7/2015 | Choi et al. | |

(Continued)

FOREIGN PATENT DOCUMENTS

| | | |
|---|---|---|
| CN | 108565887 A | 9/2018 |
| CN | 112104024 A | 12/2020 |

(Continued)

OTHER PUBLICATIONS

Office Action dated Mar. 25, 2024, issued in corresponding Japanese Patent Application No. 2023-518864 (with machine translation).

(Continued)

*Primary Examiner* — Jared Fureman
*Assistant Examiner* — Duc M Pham
(74) *Attorney, Agent, or Firm* — Morgan, Lewis & Bockius LLP (57) ABSTRACT

A power distribution apparatus may comprise a converter configured to perform DC-DC conversion between a battery and a power conversion system; and a controller configured to set a droop curve for controlling an output of the converter based on a state of each battery, wherein the converter is configured to receive and store information on the droop curve set by the controller, detect a voltage change in a DC link between the power conversion system and the converter, the voltage change being caused by a start of a charging or a discharging operation, and control the output of the converter based on a detected DC link voltage and the droop curve.

20 Claims, 11 Drawing Sheets

(56) References Cited

U.S. PATENT DOCUMENTS

| | | |
|---|---|---|
| 2016/0226268 A1 | 8/2016 | Okui |
| 2016/0268802 A1 | 9/2016 | Shim |
| 2016/0268818 A1 | 9/2016 | Shim |
| 2018/0109111 A1 | 4/2018 | Somani |
| 2018/0366948 A1 | 12/2018 | Lehn et al. |
| 2020/0287385 A1 | 9/2020 | Jin et al. |
| 2020/0321880 A1 | 10/2020 | Lee et al. |
| 2021/0083506 A1* | 3/2021 | Rao .................. H02H 7/261 |
| 2021/0104896 A1 | 4/2021 | Chae et al. |
| 2022/0294214 A1 | 9/2022 | Rikiso et al. |

FOREIGN PATENT DOCUMENTS

| | | | | |
|---|---|---|---|---|
| EP | 3 731 394 A1 | 10/2020 | | |
| JP | 2016-052170 A | 4/2016 | | |
| JP | 2019-030110 A | 2/2019 | | |
| JP | 2019-146314 A | 8/2019 | | |
| JP | 2021-509002 A | 3/2021 | | |
| KR | 10-2013-0047197 A | 5/2013 | | |
| KR | 2013047197 A * | 5/2013 | ........... | Y02E 10/723 |
| KR | 10-2014-0098431 A | 8/2014 | | |
| KR | 10-2015-0089273 A | 8/2015 | | |
| KR | 10-2016-0094228 A | 8/2016 | | |
| KR | 10-2016-0104486 A | 9/2016 | | |
| KR | 10-2016-0109271 A | 9/2016 | | |
| KR | 10-2016-0109273 A | 9/2016 | | |
| KR | 10-2017-0013772 A | 2/2017 | | |
| KR | 10-2017-0092976 A | 8/2017 | | |
| KR | 10-2019-0026785 A | 3/2019 | | |
| KR | 10-2019-0034960 A | 4/2019 | | |
| KR | 10-2019-0090433 A | 8/2019 | | |
| KR | 20190090433 A * | 8/2019 | ................ | H02J 3/32 |
| KR | 10-2019-0118436 A | 10/2019 | | |
| KR | 10-2019-0130415 A | 11/2019 | | |
| KR | 20190130415 A * | 11/2019 | ................ | H02J 3/32 |
| KR | 10-2180880 B1 | 11/2020 | | |
| KR | 10-2021-0039587 A | 4/2021 | | |
| WO | 2021/111967 A1 | 6/2021 | | |

OTHER PUBLICATIONS

International Search Report (with translation) and Written Opinion dated Sep. 2, 2022, issued in corresponding International Patent Application No. PCT/KR2022/007166.
The extended European Search Report (EESR) dated Oct. 8, 2024, issued in corresponding EP Patent Application No. 22828617.5.

* cited by examiner

POWER DISTRIBUTION DEVICE AND METHOD USING DROOP CONTROL

TECHNICAL FIELD

This application claims priority to and the benefit of Korean Patent Application No. 10-2021-0081702 filed in the Korean Intellectual Property Office on Jun. 23, 2021, the entire contents of which are incorporated herein by reference.

The present invention relates to an apparatus and a method for power distribution, and more particularly, to a power distribution apparatus and method for controlling an output of a DC-DC converter using a droop curve.

BACKGROUND ART

An energy storage system relates to renewable energy, a battery that stores electric power, and grid power. Recently, as the spread of smart grid and renewable energy is expanding and the efficiency and the stability of the power system are emphasized, a demand for energy storage systems for power supply and demand control and power quality improvement is increasing. Depending on a purpose of use, energy storage systems may have different output and capacity. In order to configure a large-capacity energy storage system, a plurality of battery systems may be connected.

An energy storage system may include a battery section with a plurality of batteries, a battery management system (BMS), a power conversion system (PCS), an energy management system (EMS), and a DC-DC converter, etc. Meanwhile, in an energy storage system with a plurality of DC-DC converters for a plurality of batteries, it is necessary to control outputs of the DC-DC converters in consideration of each battery state.

SUMMARY

Technical Problem

To obviate one or more problems like those described above, an object of the present disclosure is to provide a power distribution apparatus including a DC-DC converter for controlling an output using a droop curve and a controller for setting and providing the droop curve.

Another object of the present disclosure is to provide a power distribution method performed by the above power distribution apparatus.

Yet another object of the present disclosure provide a DC-DC converter for controlling an output using a preset and stored droop curve.

Technical Solution

In order to achieve the objective of the present disclosure, a power distribution apparatus may comprise a converter configured to perform DC-DC conversion between a battery and a power conversion system; and a controller configured to set a droop curve for controlling an output of the converter based on a state of each battery, wherein the converter is configured to receive and store information on the droop curve set by the controller, detect a voltage change in a DC link between the power conversion system and the converter, the voltage change being caused by a start of a charging or a discharging operation, and control the output of the converter based on a detected DC link voltage and the droop curve.

In the embodiment, the droop curve may indicate a relationship between the voltage of the DC link and the output power of the converter.

The converter may be configured to derive an output power matching the detected DC link voltage in the droop curve and set the derived output power as an output reference of the converter.

In addition, the droop curve may include a dead band in which neither charging nor discharging is performed for a certain range of DC link voltages.

In the embodiment, charging or discharging may be completed at a DC link voltage in which a sum of outputs of the plurality of converters connected to the PCS matches the power of the PCS, thereby maintaining balance.

Furthermore, a slope of the droop curve for each battery may be set based on a state of the battery and the droop curve includes information on max charge power and max discharge power.

According to another embodiment of the present disclosure, a power distribution method in a converter configured to perform DC-DC conversion between a battery and a power conversion system may comprise receiving information on a droop curve for controlling an output of the converter from a controller that manages states of a plurality of batteries and storing the information on a droop curve; detecting a voltage change at a DC link between the power conversion system and the converter; and controlling an output of the converter according to a detected DC link voltage and the droop curve to discharge or charge the plurality of batteries.

In the embodiment, the droop curve may indicate a relationship between the voltage of the DC link and the output power of the converter.

In the embodiment, an output power matching the detected DC link voltage in the droop curve may be set as an output reference of the converter.

In addition, the droop curve may include a dead band in which neither charging nor discharging is performed for a certain range of DC link voltages.

In the embodiment, charging or discharging may be completed at a DC link voltage in which a sum of outputs of the plurality of converters connected to the PCS matches the power of the PCS, thereby maintaining balance.

Furthermore, a slope of the droop curve for each battery may be set based on a state of the battery and the droop curve includes information on max charge power and max discharge power.

The controlling the output of the converter may comprise calculating an output reference from the droop curve using the DC link voltage; controlling the output of the converter based on the output reference; and terminating the charging or discharging when the DC link voltage reached a balance.

According to another embodiment of the present disclosure, a converter may be configured to perform DC-DC conversion between a battery and a power conversion system, the converter comprise a memory configured to store information on a droop curve for controlling an output of the converter; and a processor configured to detect a voltage change at a DC link between the power conversion system and the converter and control an output of the converter according to a detected DC link voltage and information on the droop curve.

The droop curve may indicate a relationship between the voltage of the DC link and the output power of the converter.

The converter may be configured to derive an output power matching the detected DC link voltage in the droop curve and set the derived output power as an output reference of the converter.

The droop curve may include a dead band in which neither charging nor discharging is performed for a certain range of DC link voltages.

In the embodiment, charging or discharging may be completed at a DC link voltage in which a sum of outputs of the plurality of converters connected to the PCS matches the power of the PCS, thereby maintaining balance.

Furthermore, a slope of the droop curve for each battery may be set based on a state of the battery and the droop curve includes information on max charge power and max discharge power.

Advantageous Effects

According to embodiments of the present disclosure, even with a general-purpose power conversion system (and an inverter), a DC-DC converter can quickly calculate an output reference value using a pre-stored droop curve, thereby enabling a stable operation of the energy storage system.

In addition, it is possible to efficiently operate batteries according to a state of an individual battery.

DETAILED DESCRIPTION

The present invention may be modified in various forms and have various embodiments, and specific embodiments thereof are shown by way of example in the drawings and will be described in detail below. It should be understood, however, that there is no intent to limit the present invention to the specific embodiments, but on the contrary, the present invention is to cover all modifications, equivalents, and alternatives falling within the spirit and technical scope of the present invention. Like reference numerals refer to like elements throughout the description of the figures.

It will be understood that, although the terms such as first, second, A, B, and the like may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes combinations of a plurality of associated listed items or any of the plurality of associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments of the present invention will be described in detail with reference to the accompanying drawings.

Figure 1:
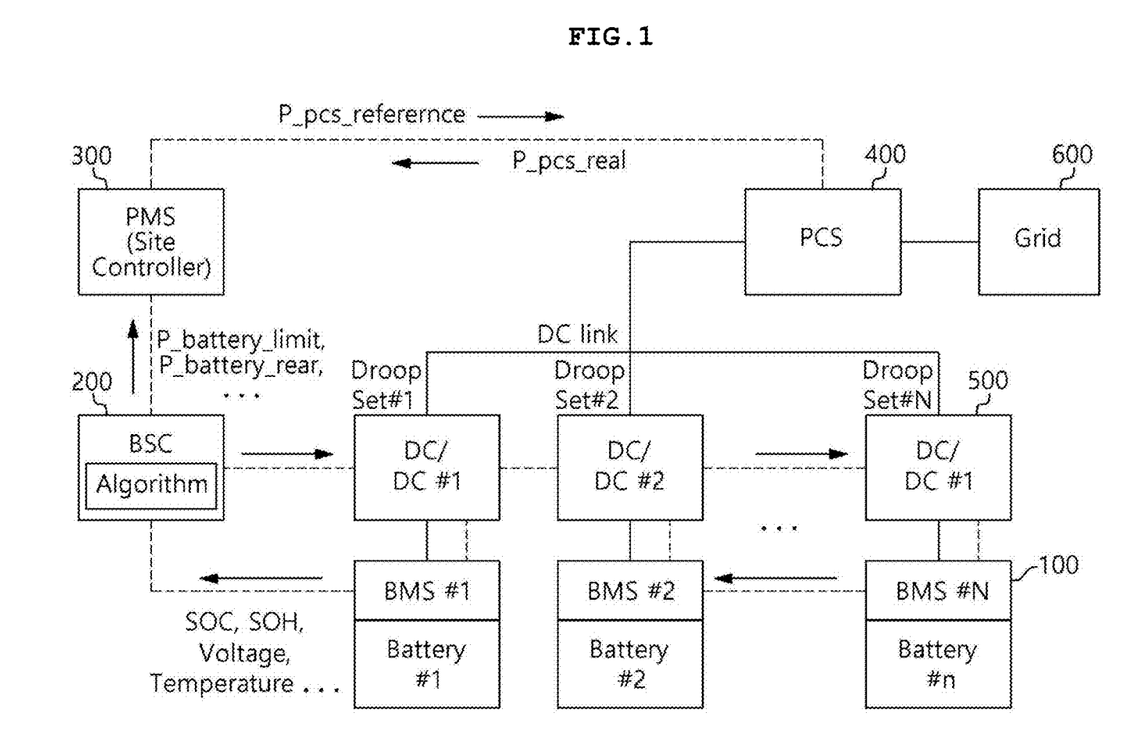
FIG. 1 is a block diagram of an energy storage system to which the present invention may be applied.

FIG. 1 is a block diagram of an energy storage system to which the present invention may be applied.

In an energy storage system (ESS), a battery is used for storing energy or power. Typically, multiple battery modules may form a battery rack and multiple battery racks form a battery bank. Here, depending on a device or a system in which the battery is used, a battery rack may be referred to as a battery pack. Battery #1, battery #2, . . . , and battery #N shown in FIG. 1 may be a battery pack or a battery rack.

Referring to FIG. 1, a battery management system (BMS) 100 may be installed for each battery. The BMS 100 may monitor a current, a voltage and a temperature of each battery pack (or rack) to be managed, calculate a State Of Charge (SOC) of the battery based on a monitoring result to control charging and discharging.

A battery section controller (BSC) 200 may be located in each battery section which includes a plurality of batteries, peripheral circuits, and devices to monitor and control objects such as a voltage, a current, a temperature, and a circuit breaker.

A power conversion system (PCS) 400 installed in each battery section may control power supplied from the outside and power supplied from the battery section to the outside, thereby controlling charging and discharging of the battery. The power convertion system may include a DC/AC inverter. The output of the DC-DC converter 500 may be connected to the PCS 400 and the PCS 400 may be connected to the power grid 600. Here, the PCS 400 typically operates in a constant power mode. A power management system (PMS) 300 connected to the PCS may control the output of the PCS based on the monitoring and control results of the battery management system or the battery section controller.

In the energy storage system of FIG. 1, battery #1 is connected to DC-DC converter #1, battery #2 is connected to DC-DC converter #2, and battery #N is connected to DC-DC #N. The output of the DC-DC converter corresponding to each battery is connected to the PCS 400 through a DC link.

The DC-DC converter may be a bidirectional converter, wherein when conversion is performed from the battery to the load direction, the input of the DC-DC converter is connected to a battery (a battery unit, a battery rack or a battery pack) and the output of the DC-DC converter may be connected to a load. As examples of the DC-DC converter, various types of converters such as a full-bridge converter, a half-bridge converter, and a flyback converter may be used.

Meanwhile, communication among the BMS 100, the BSC 200, the PMS 300, and the PCS 400 may be implemented through a controller area network (CAN) or Ethernet (indicated by a dotted line in FIG. 1).

In such an energy storage system, when the output control of the DC-DC converter is performed by a central controller (for example, the BSC) each time, a voltage fluctuation at the DC link may occur due to a time delay from calculation by the BSC to an actual output by the DC-DC converter. To solve this problem, a method of operating the PCS in a fixed voltage range, or a method of adding a large-capacity capacitor or battery to the DC link to ensure safe operation of the system may be used. However, the method of operating the PCS in a fixed voltage range has a disadvantage in that it requires modification of a PCS firmware since a general-purpose PCS operates in a fixed power mode. In addition, the method of adding a large-capacity capacitor or battery to the DC link has a problem of causing additional cost increase.

The present invention is proposed to solve this problem, and according to embodiments of the present invention shown in FIG. 1, the BSC 200 which is configured to manage overall control of the battery section may set a droop curve of each DC-DC converter based on a state of each battery and provide it to each DC-DC converter before operating the system.

Here, the state of each battery may include information such as a state of charge (SOC), a state of health (SOH), a voltage, and a temperature of each battery. The BSC 200 may provide information such as limit power (P_battery_limit) and real power (P_battery_real) of each battery to the power management system 300. The power management system 300 in charge of controlling the entire ESS system may issues a charge command or a discharge command (via P_pcs_reference) to the power conversion system 400 during system operation.

At this time, the DC link voltage where outputs of the DC-DC converters 500 and the input of the PCS 400 encounter may be shaken by an operation of the PCS 400 that has received the charge or discharge command. Here, each DC-DC converter may sense the DC link voltage being shaken and calculate a DC-DC output reference by referring to a droop curve preset for the DC-DC converter itself. The DC-DC converter may use the calculated output reference to perform output control to follow the output reference in real time.

For this, a DC-DC converter according to embodiments of the present invention may include a memory for storing droop curve information related to output control of the converter and a processor configured to detect a voltage change at the DC link between the PCS and the converter and to control an output of the converter according to the detected DC link voltage and the droop curve.

The DC-DC converter may further include an input switching set, a primary coil, a secondary coil, an output switching set, a capacitor, etc.

The converter 500 and the battery section controller (BSC) 200 shown in FIG. 1 may constitute a power distribution apparatus according to embodiments of the present invention. More specifically, a power distribution apparatus according to embodiments of the present invention may include a converter for performing DC-DC conversion between a battery and a power conversion system (PCS) and a controller for determining a droop curve related to output control of the converter according to the state of each battery. Here, the controller may be a battery section controller.

The converter may be configured to receive and store information related to the droop curve set by the controller, detect a voltage change in a DC link between the power conversion system and the converter, the voltage change being caused by a start of a charging or a discharging operation, and control output of the converter based on the detected DC link voltage and the droop curve.

As such, in the present invention, an output reference of the battery is not received during operation of the energy storage system from a central controller. Instead, the DC-DC converter may quickly calculate an output reference value by itself according to a preset droop curve before actual operation of the energy storage system and control its output, which leads to stable operation of the system.

Figure 2A:
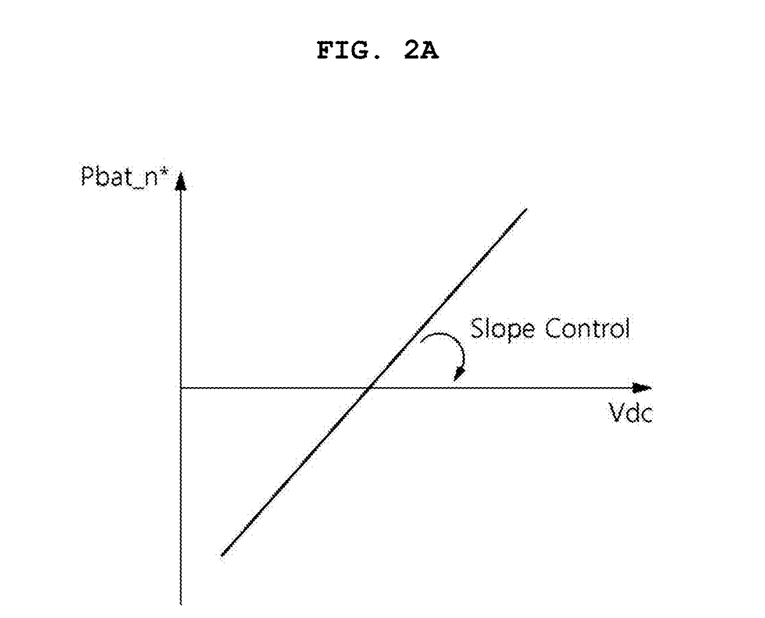
FIG. 2A is a graph illustrating a concept of a slope control in a droop curve used for output control of a DC-DC converter according to embodiments of the present invention.

FIG. 2A is a graph illustrating a concept of a slope control in a droop curve used for output control of a DC-DC converter according to embodiments of the present invention.

In the graph of FIG. 2A, the horizontal axis represents a voltage (Vdc) of the DC link, and the vertical axis represents an output power (Pbat_n) of each battery. The BSC may control the output of each battery using slope control as shown in FIG. 2A based on a state of each battery.

Figure 2B:
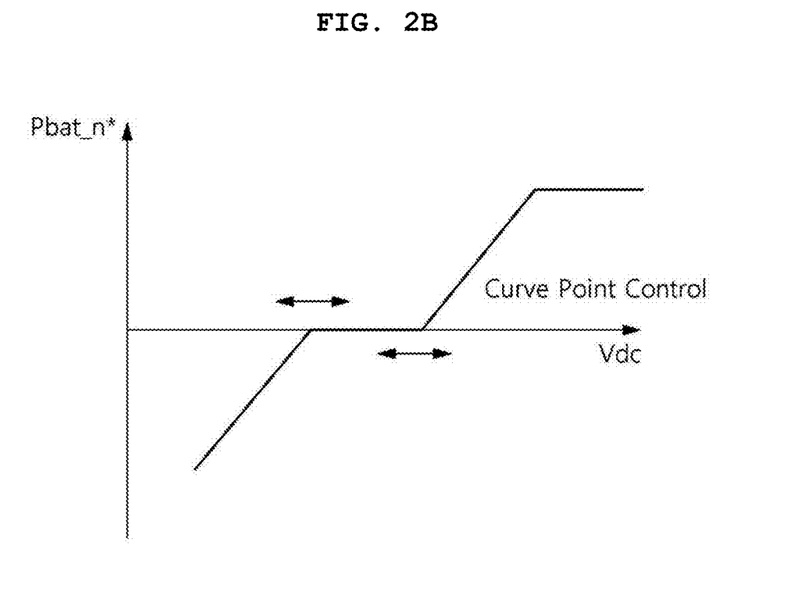
FIG. 2B is a graph illustrating a dead band in a droop curve used for output control of a DC-DC converter according to embodiments of the present invention.

FIG. 2B is a graph illustrating a dead band concept in a droop curve used for output control of a DC-DC converter according to embodiments of the present invention.

In the graph of FIG. 2B, the horizontal axis represents the voltage (Vdc) of the DC link, and the vertical axis represents the output power (Pbat_n) of each battery. In the present invention, curve point control is used as well as droop curve slope control. Here, the curve point may include an upper limit point and a lower limit point of the dead band region. That is, according to the embodiment of the present invention, a dead band in which neither charging nor discharging is performed is placed in the droop curve and the DC-DC converter output can be controlled based on the droop curve, in order to prevent a frequent charging and discharging that may occur due to a DC link voltage sensing error among a plurality of DC-DC converters. As shown in FIG. 2b, a range of the dead band can be adjusted according to a situation in the system.

Figure 3:
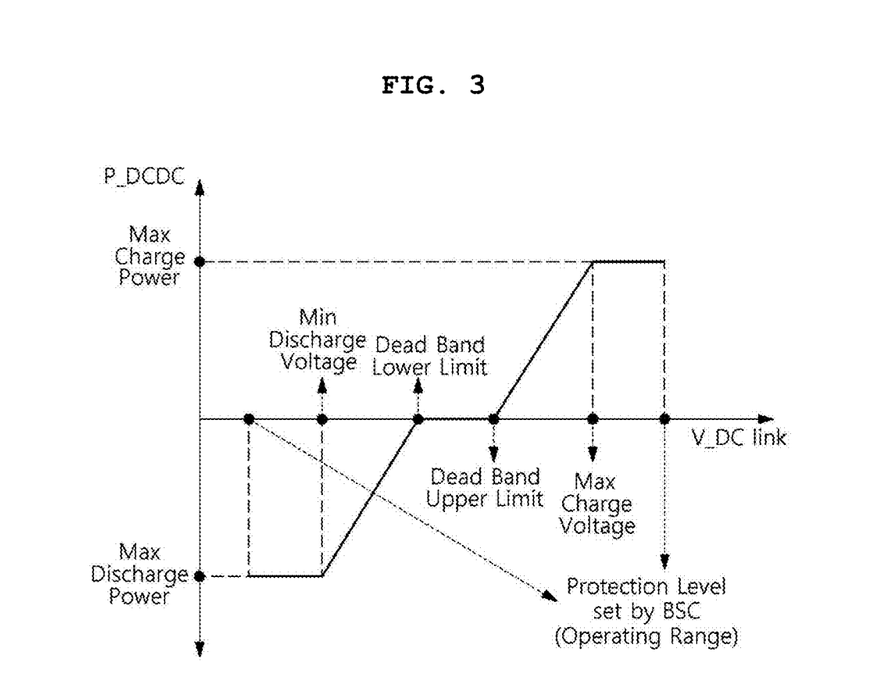
FIG. 3 is a graph illustrating in more detail a droop curve used for output control of a DC-DC converter according to embodiments of the present invention.

FIG. 3 is a graph illustrating in more detail a droop curve used for output control of a DC-DC converter according to embodiments of the present invention.

In the graph of FIG. 3, the horizontal axis represents a voltage (V_DC link) of the DC link, and the vertical axis represents an output power (P_DCDC) of the DC-DC converter corresponding to each battery.

The battery section controller may control the output power of the DC-DC converter corresponding to each battery by controlling the slope of the droop curve in consideration of the state of each battery. In addition, the battery section controller may set a charge/discharge operation range by setting a Max Charge Power and a Max Discharge Power.

In the droop curve shown in FIG. 3, the dead band in which charging and discharging are not performed may be defined by the Dead Band Upper Limit and the Dead Band Lower Limit. Further, in the droop curve of FIG. 3, a Maximum charge voltage at which charging is stopped because charging to the maximum has performed and a Minimum discharge voltage at which discharging is stopped.

As described above, in the present invention, the droop curve control is for maintaining the voltage of the DC link constant and the dead-band is for preventing frequent charging/discharging due to noise and sensing errors in a standby state. The dead band may be set, for example, in a range of 850-900V, which is a voltage range of the DC link in a standby state.

Figure 4A:
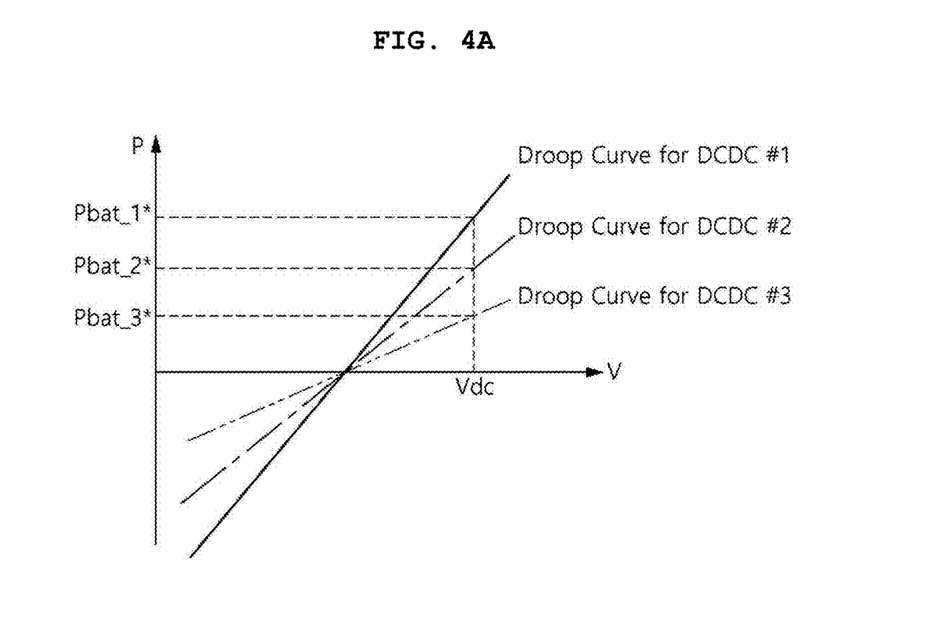
FIG. 4A is a graph illustrating a plurality of droop curves applied to a plurality of DC-DC converters according to embodiments of the present invention.

FIG. 4A is a graph illustrating a plurality of droop curves applied to a plurality of DC-DC converters according to embodiments of the present invention.

In the graph of FIG. 4A, the horizontal axis represents a voltage (Vdc) of the DC link, and the vertical axis represents output powers of the battery 1, battery 2, and battery 3. In the graph of FIG. 4A, the slope of the droop curve for each battery is set differently, which means that the outputs between the battery packs/racks can be set differently depending on state of each battery(for example, SOC).

Figure 4B:
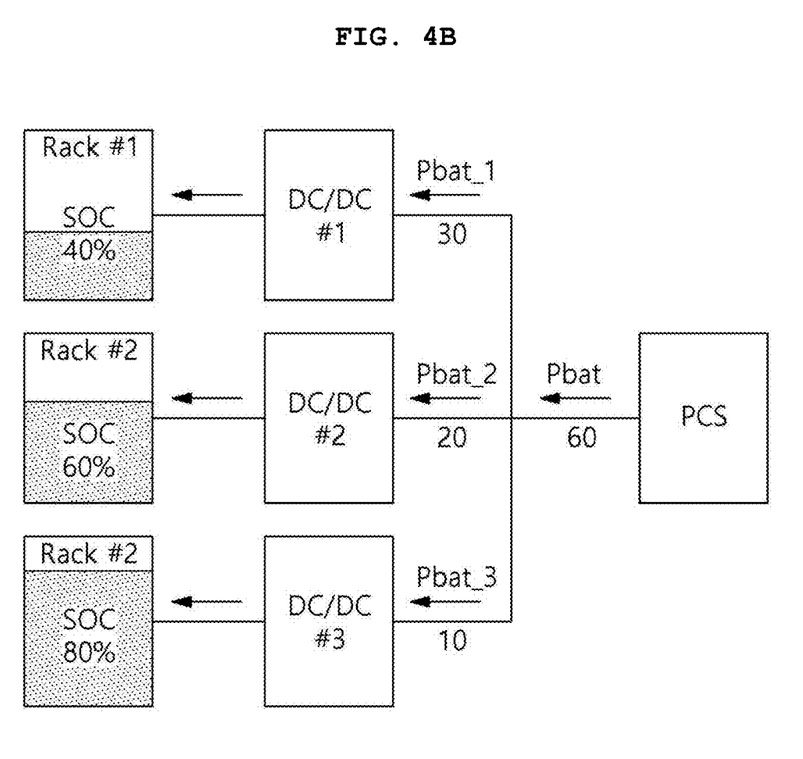
FIG. 4B illustrates charging flows for respective batteries when different droop curves are applied to a plurality of DC-DC converters according to embodiments of the present invention.

FIG. 4B illustrates charging flows for respective batteries when different droop curves are applied to a plurality of DC-DC converters according to embodiments of the present invention. That is, FIG. 4B shows an example of a power distribution method using droop curves for batteries having same capacity but different initial SOC values.

For example, in FIG. 4B, the droop curve with the largest slope is set for battery rack #1 having the lowest SOC of 40%, and accordingly, DC-DC converter #1 outputs the largest power.

When the power conversion system connected to the plurality of DC-DC converters commands a start of charging operation in a constant power mode, the DC link voltage rises in short time and each DC-DC converter refers to the increased DC link voltage and a droop curve for each battery to determine amount of charge for each battery. Then, each DC-DC converter may perform charging to maintain a balance at a Vdc voltage balancing with Pdc=Pdc_1+Pdc_2+Pdc_3.

Figure 5:
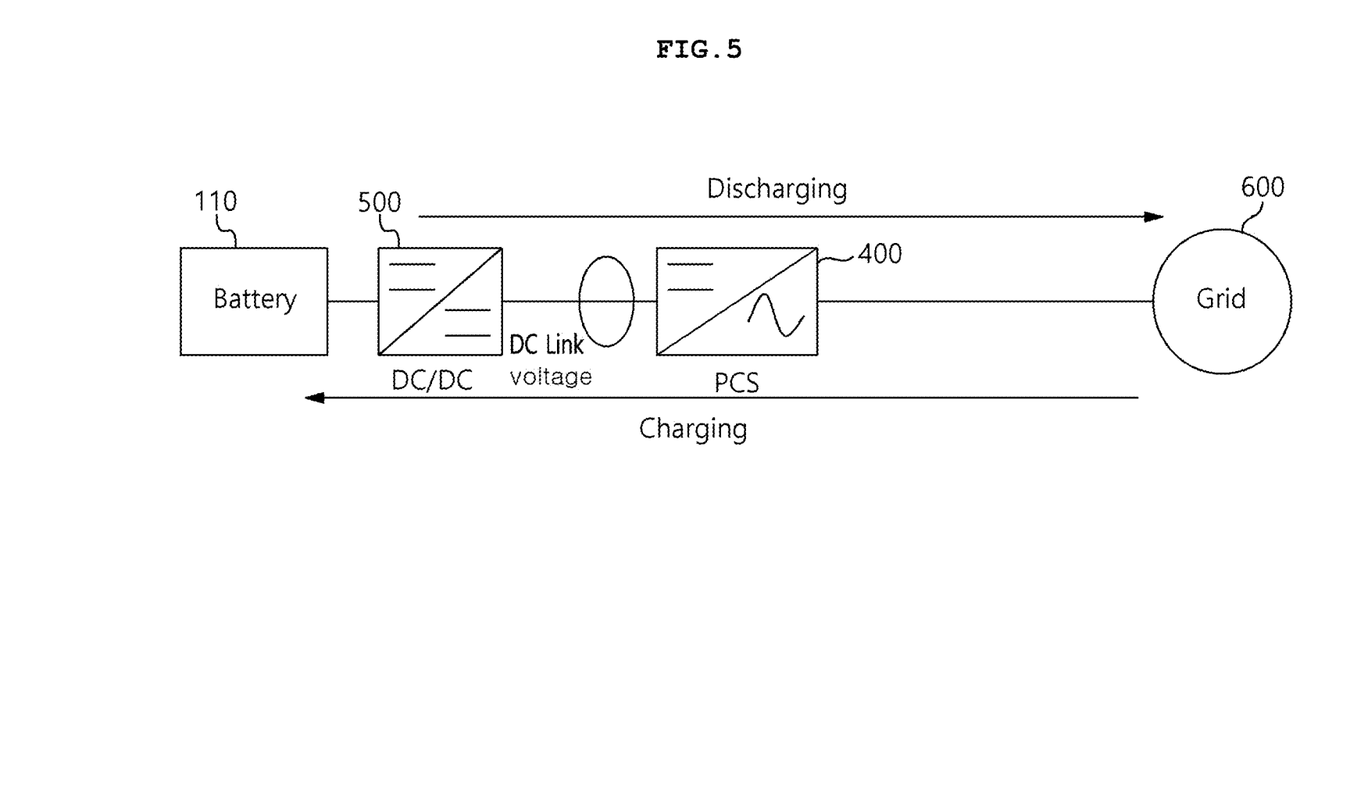
FIG. 5 is a conceptual diagram illustrating flows of charging and discharging between a battery and a grid according to the present invention.

FIG. 5 is a conceptual diagram illustrating flows of charging and discharging between a battery and a power grid according to the present invention.

FIG. 5 shows a charge flow from the grid 600 to the PCS, and to the battery 110 through the DC-DC converters 500 using droop curves which are stored in the DC-DC converters for respective batteries.

In addition, according to a discharge control using the droop curves stored in the DC-DC converters for respective battery, a discharge process may be performed from the battery 110 through the DC-DC converter 500 and the PCS 400 to the grid 600.

Figure 6:
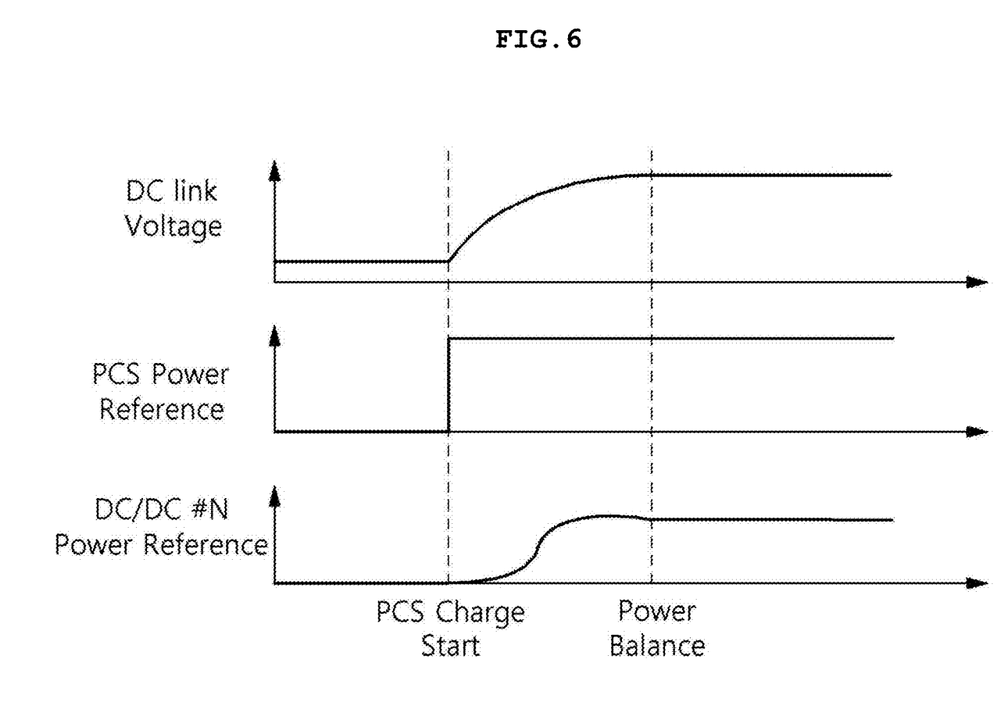
FIG. 6 shows graphs of a DC link voltage, power references of PCS and DC-DC converter in a charge process according to embodiments of the present invention.

FIG. 6 shows graphs of a DC link voltage, power references of PCS and DC-DC converter in a charge process according to embodiments of the present invention.

When a charge process is performed in an energy storage system to which the present invention is applied, the PMS 300 may transmit a charge command to the PCS 400. Upon receiving the charge command, the PCS 400 may start operating (at PCS charge start in FIG. 6) and supply power to the DC link. Thus, the voltage of the DC link may start to rise accordingly.

The DC-DC converter may sense the rising DC link voltage, refer to its droop curve, and output power corresponding to the DC link voltage value to charge the battery. When the PCS output power matches the sum of the outputs of the plurality of DC-DC converters, thereby reaching power balance at a corresponding DC link voltage and the charge operation to the battery is stopped.

Figure 7:
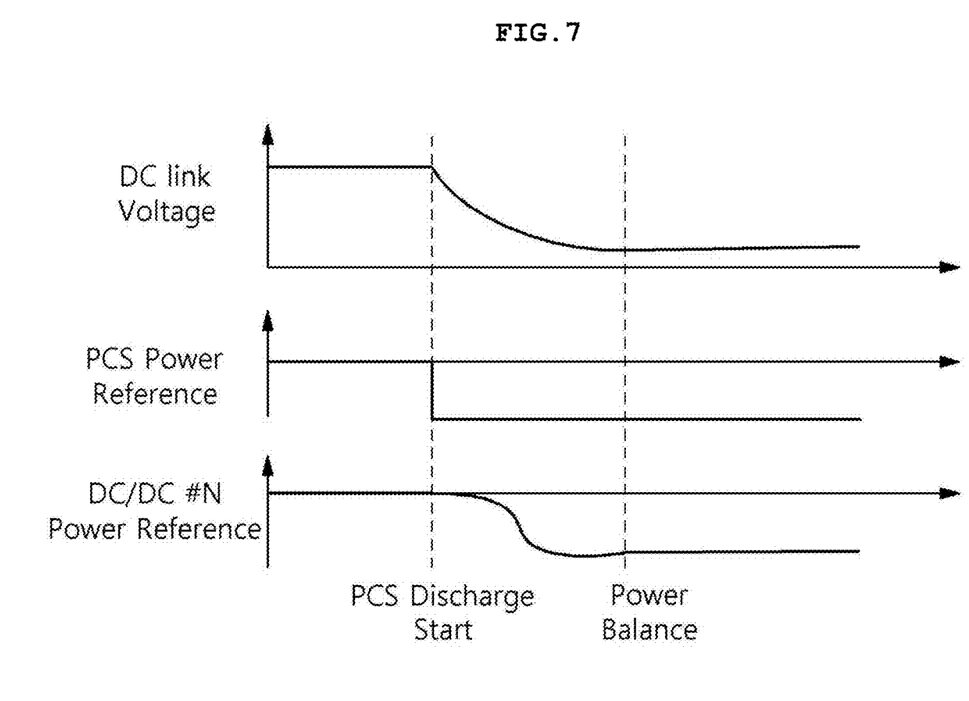
FIG. 7 shows graphs of a DC link voltage, power references of PCS and DC-DC converter in a discharge process according to embodiments of the present invention.

FIG. 7 shows graphs of a DC link voltage, power references of PCS and DC-DC converter in a discharge process according to embodiments of the present invention.

When a discharge process is performed in an energy storage system to which the present invention is applied, the PCS 400 may receive a discharge command from the PMS 300 and start operating (at PCS discharge start in FIG. 7) to supply power to the grid. As the power drains, the voltage on the DC link begins to drop.

The DC-DC converter may sense the falling DC link voltage and discharge the battery by outputting power corresponding to the DC link voltage based on the droop curve set therein to the PCS. When the PCS output power matches the sum of the outputs of the plurality of DC-DC converters, thereby reaching power balance at a corresponding DC link voltage and the discharge operation from the battery is stopped.

Figure 8:
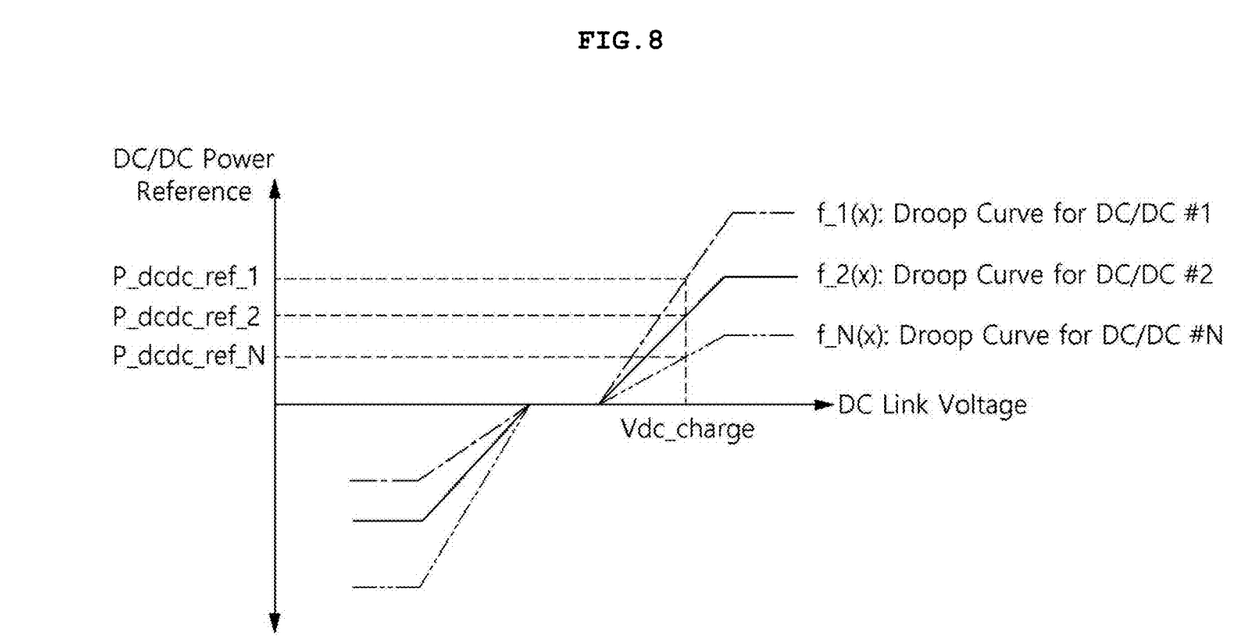
FIG. 8 is a graph showing an output reference calculation process of a plurality of DC-DC converters in a charge process according to the present invention.
Figure 9:
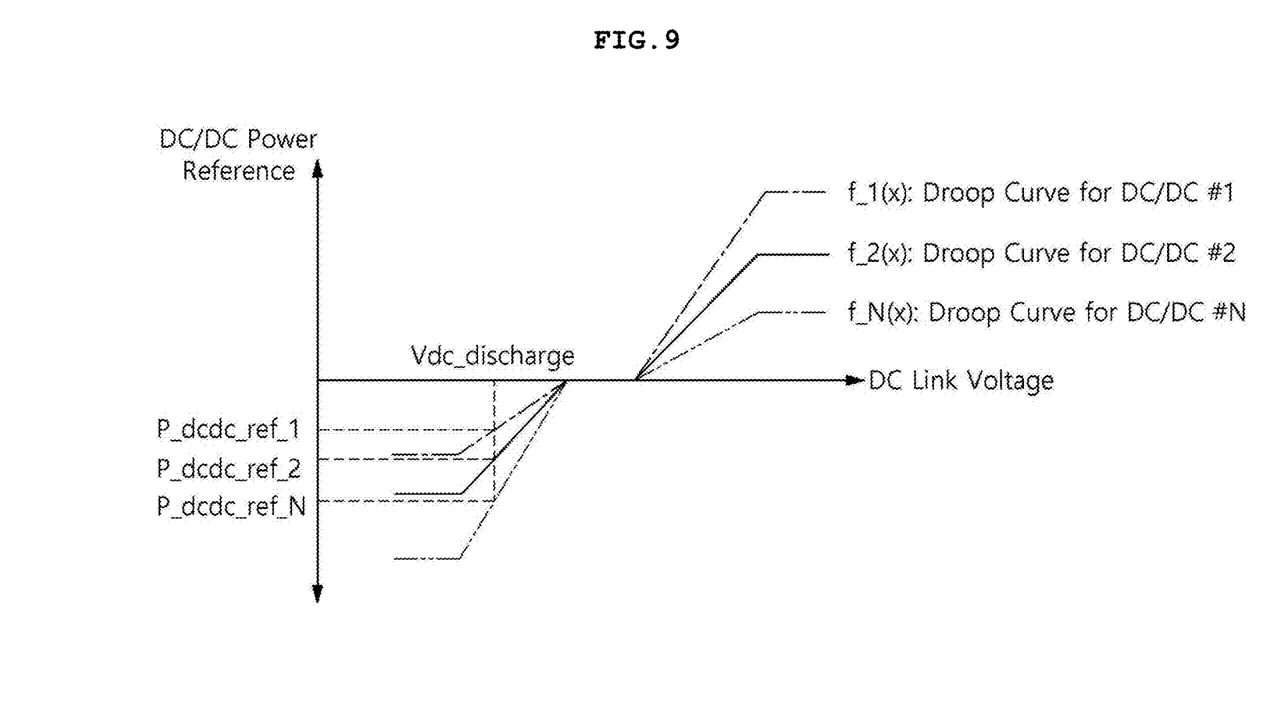
FIG. 9 is a graph showing an output reference calculation process of a plurality of DC-DC converters in a discharge process according to the present invention.

FIG. 8 is a graph showing an output reference calculation process of a plurality of DC-DC converters in a charge process according to the present invention. FIG. 9 is a graph showing an output reference calculation process of a plurality of DC-DC converters in a discharge process according to the present invention.

In FIGS. 8 and 9, each curve represents a droop curve of each DC-DC converter. In FIGS. 8 and 9, the power references in a section in which the DC link voltage is constant indicates a Max Charge Power and a Max Discharge Power.

Equation 1 below shows a function for each droop curve.

$$P\_dcdc\_ref\_N = f\_N(x) \qquad \text{[Equation 1]}$$

In Equation 1, P_dcdc_ref indicates an output reference of each DC-DC converter, and f_N(x) indicates a droop curve function of DC-DC converter N. In addition, x represents the DC link voltage Vdc which becomes Vdc_charge during charging and Vdc_discharge during discharging.

That is, Equation 1 presents that the DC-DC converter performs output control according to a value defined by the droop curve function.

Equation 2 below indicates the sum of the outputs of droop curve functions corresponding to the output power of the PCS during charging, and is balanced at the Vdc_charge shown in FIG. 8.

$$P\_pcs\_charge\_ref = f\_1(Vdc\_charge) + f\_2(Vdc\_charge) \ldots f\_N(Vdc\_charge) \quad \text{[Equation 2]}$$

In addition, Equation 3 below indicates the sum of the outputs of droop curve functions corresponding to the output power of the PCS during discharge, and is balanced at the Vdc_discharge.

$$P\_pcs\_discharge\_ref = f\_1(Vdc\_discharge) + f\_2(Vdc\_discharge) \ldots + f\_N(Vdc\_discharge) \quad \text{[Equation 3]}$$

In Equations 2 and 3, P_pcs_ref represents the output reference of the PCS, Vdc_charge represents the balanced voltage of the DC link during charging, and Vdc_discharge represents the balanced voltage of the DC link during discharging.

Figure 10:
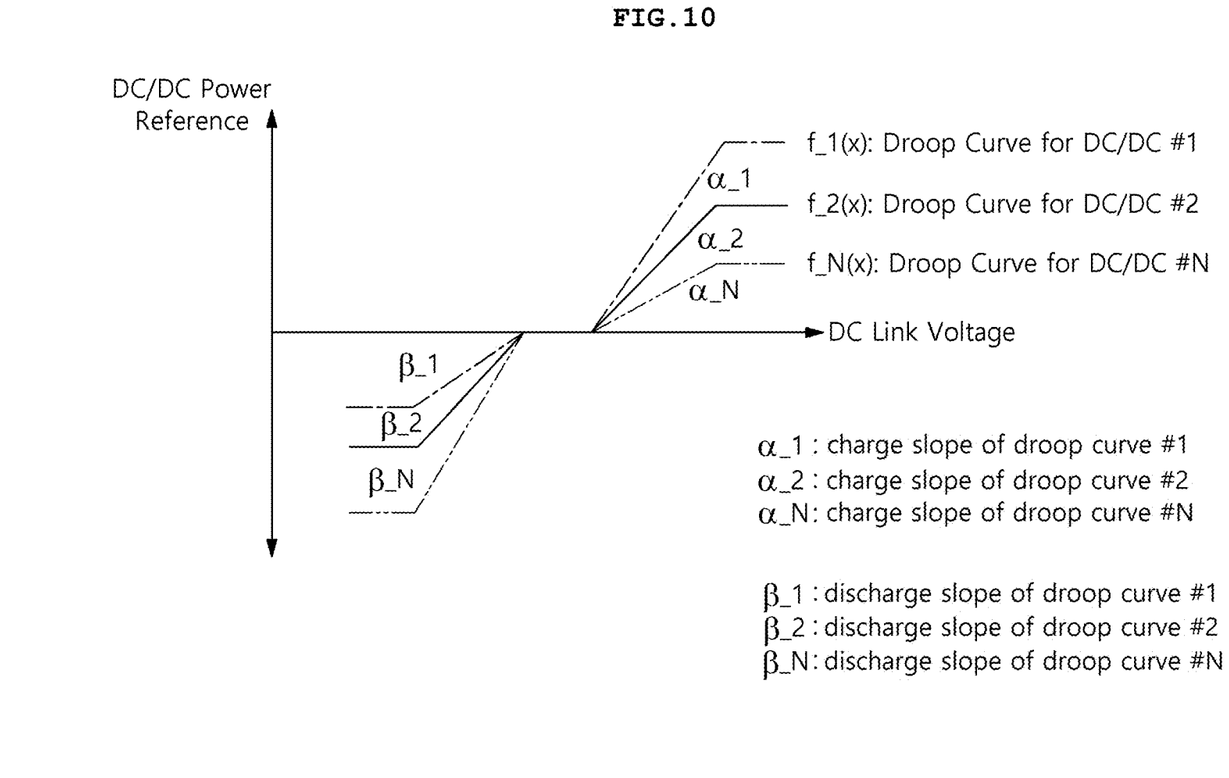
FIG. 10 is a graph showing a concept of calculating slopes of droop curves of a plurality of DC-DC converters in a charge/discharge process according to the present invention.

FIG. 10 is a graph showing a concept of calculating slopes of droop curves of a plurality of DC-DC converters in a charge/discharge process according to the present invention.

The graph of FIG. 10 shows the slopes of the droop curves of the plurality of DC-DC converters, and the slopes of the curves are different from each other.

In the present invention, the slope of the droop curve for each DC-DC converter may be determined based on a battery capacity (Cap_N) and a SOC value, and additionally a SOH. Accordingly, the charge slope ratio ($\alpha\_1: \alpha\_2: \ldots :\alpha\_N$) according to the droop curve for each battery may be defined as in Equation 4 below.

$$\alpha\_1:\alpha\_2:\ldots:\alpha\_N = Cap\_1 \times (1-SOC\_1):Cap\_2 \times (1-SOC\_2) \ldots :Cap\_N \times (1-SOC\_N) \quad \text{[Equation 4]}$$

It is clarified from Equation 4 that a charge slope of each battery is proportional to an empty space area (1−SOC_N) of the battery capable of storing additional energy and the capacity of each battery (Cap_N).

Furthermore, the discharge slope ratio ($\beta\_1: \beta\_2: \ldots :\beta\_N$) according to the droop curve for each battery may be defined as in Equation 5 below.

$$\beta\_1:\beta\_2:\ldots:\beta\_N = Cap\_1 \times SOC\_1:Cap\_2 \times SOC\_2 \ldots :Cap\_N \times SOC\_N \quad \text{[Equation 5]}$$

Here, Cap_N indicates a capacity [Wh] of battery N, and SOC_N indicates a SOC of battery N.

Since the discharge slope of each battery is related to how much energy stored in the battery to be extracted, the discharge slope is proportional to the SOC and the battery capacity (Cap_N) of each battery.

Figure 11:
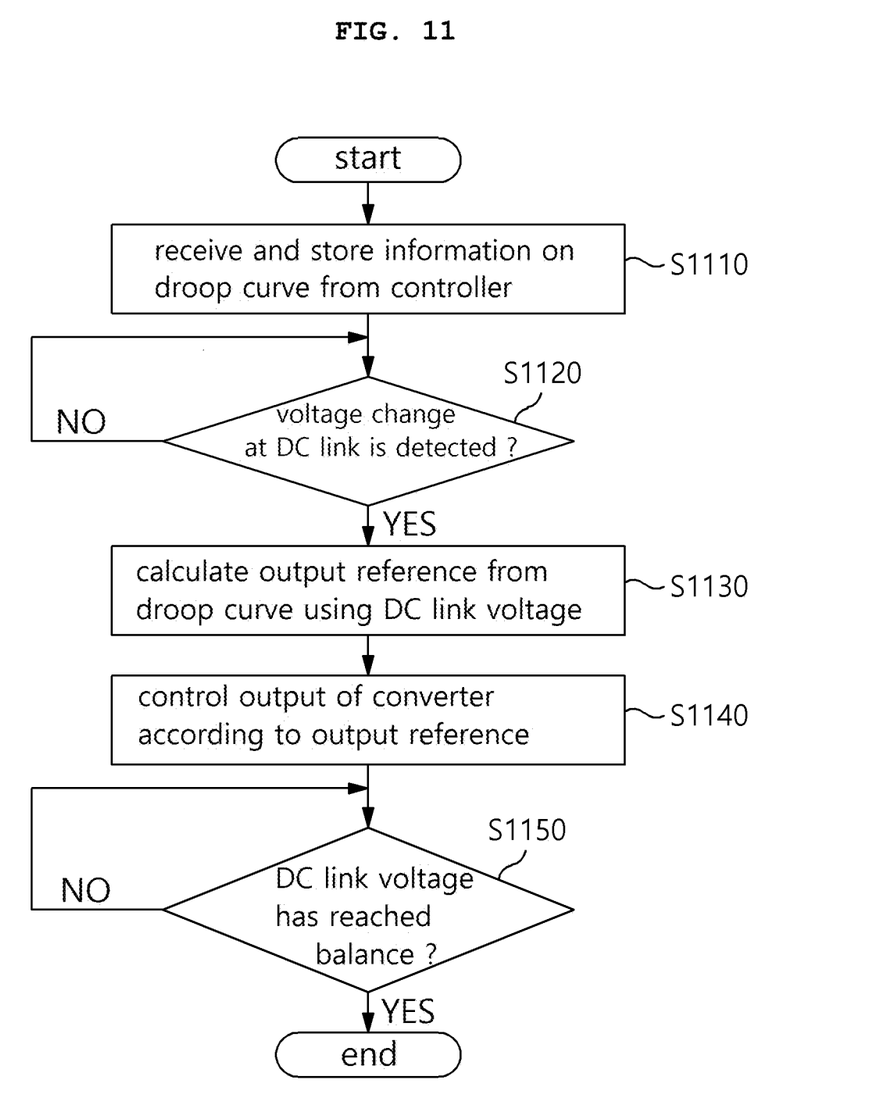
FIG. 11 is a process flow chart of a power distribution method according to embodiments of the present invention.

FIG. 11 is a process flow chart of a power distribution method according to embodiments of the present invention.

The power distribution method according to embodiments of the present invention may be performed by a converter that performs DC-DC conversion between a battery and a power conversion system (PCS).

The converter may receive information on a droop curve related to output control of the converter from a controller that manages states of a plurality of batteries, and store the information (S1110). Here, the controller may be, for example, a battery section controller.

Then, when the converter, during charging or discharging, detects a voltage change at the DC link between the PCS and the converter (YES in S1120), the converter may calculate an output reference from the stored droop curve information using the detected DC link voltage value (S1130). The converter may control its output according to the calculated output reference (S1140).

Then, the converter may determine whether the DC link voltage has reached a balance (S1150). When the DC link voltage has reached the balance (Yes in S1150), the converter may terminate the charge or discharge procedure.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above example hardware device can be configured to operate as at least one software module in order to perform the embodiments of the present disclosure, and vice versa.

Some aspects of the present invention have been described above in the context of a device but may be described using a method corresponding thereto. Here, blocks or the device corresponds to operations of the method or characteristics of the operations of the method. Similarly, aspects of the present invention described above in the context of a method may be described using blocks or items corresponding thereto or characteristics of a device corresponding thereto. Some or all of the operations of the method may be performed, for example, by (or using) a hardware device such as a microprocessor, a programmable computer or an electronic circuit. In some embodiments, one or more of most important operations of the method may be performed by such a device.

While the example embodiments of the present invention and their advantages have been described in detail, it should be understood that various changes, substitutions and alterations may be made herein without departing from the scope of the invention.

The invention claimed is:

1. A power distribution apparatus, comprising:
   a converter configured to perform DC-DC conversion between a battery and a power conversion system (PCS); and
   a controller configured to set a droop curve for controlling an output of the converter based on a state of the battery,
   wherein the converter is configured to:
   receive and store information on the droop curve set by the controller,
   detect a voltage change in a DC link between the PCS and the converter, the voltage change being caused by a start of a charging or a discharging operation, and
   control the output of the converter based on a detected DC link voltage and the droop curve, and wherein the droop curve includes a dead band in which neither charging nor discharging is performed for an adjustable range of DC link voltages.

2. The power distribution apparatus of claim 1, wherein the DC link is connected directly between the PCS and the converter, and the droop curve indicates a relationship between the voltage of the DC link and an output power of the converter.

3. The power distribution apparatus of claim 1, wherein the converter is further configured to:
derive an output power matching the detected DC link voltage in the droop curve,
set the derived output power as an output reference of the converter, and
control the output of the converter based on the output reference.

4. The power distribution apparatus of claim 1, wherein the PCS is connected to a plurality of converters including the converter, the plurality of converters being configured to perform DC-DC conversion respectively between the PCS and a plurality of batteries including the battery,
wherein the controller is further configured to set a plurality of droop curves, including the droop curve, respectively for plurality of converters, the droop curves having different slopes from each other, and
wherein charging or discharging is completed at a DC link voltage at which a sum of outputs of the plurality of converters connected to the PCS matches a power of the PCS, thereby maintaining balance.

5. The power distribution apparatus of claim 1, wherein:
a slope of the droop curve for the battery is set based on the state of the battery, and the droop curve includes information on a maximum charge power and a maximum discharge power; and
the controller is in communication with the converter via a controller area network or Ethernet.

6. A power distribution method in a converter configured to perform DC-DC conversion between a battery among a plurality of batteries and a power conversion system (PCS), the method comprising:
receiving information on a droop curve for controlling an output of the converter from a controller configured to manage states of the plurality of batteries and storing the received information on a droop curve;
detecting a voltage change at a DC link between the PCS and the converter; and
controlling an output of the converter according to a detected DC link voltage and the droop curve to discharge or charge the battery among the plurality of batteries,
wherein the droop curve includes a dead band in which neither charging nor discharging is performed for an adjustable range of DC link voltages.

7. The power distribution method of claim 6, wherein the DC link is connected directly between the PCS and the converter, and the droop curve indicates a relationship between the voltage of the DC link and an output power of the converter.

8. The power distribution method of claim 6, wherein the controlling of the output of the converter includes:
setting an output power matching the detected DC link voltage in the droop curve is set as an output reference of the converter; and
controlling the output of the converter based on the output reference.

9. The power distribution method of claim 6, wherein the PCS is connected to a plurality of converters including the converter, the plurality of converters being configured to perform DC-DC conversion respectively between the PCS and the plurality of batteries,
wherein the plurality of converters respectively store information on a plurality of droop curves, including the droop curve, the droop curves having different slopes from each other, and
wherein charging or discharging is completed at a DC link voltage at which a sum of outputs of the plurality of converters connected to the PCS matches a power of the PCS, thereby maintaining balance.

10. The power distribution method of claim 6, wherein:
a slope of the droop curve for the battery is set based on a state of the battery, and the droop curve includes information on a maximum charge power and a maximum discharge power; and
the receiving of the information on the droop curve includes receiving the information on the droop curve from the controller via a controller area network or Ethernet.

11. The power distribution method of claim 6, wherein the controlling of the output of the converter comprises:
calculating an output reference from the droop curve using the detected DC link voltage;
controlling the output of the converter based on the output reference; and
terminating the charging or discharging if the DC link voltage has reached a balance.

12. A converter configured to perform DC-DC conversion between a battery and a power conversion system (PCS), the converter comprising:
a memory configured to store information on a droop curve for controlling an output of the converter; and
a processor configured to:
detect a voltage change at a DC link between the PCS and the converter; and
control an output of the converter according to a detected DC link voltage and the stored information on the droop curve,
wherein the droop curve includes a dead band in which neither charging nor discharging is performed for an adjustable range of DC link voltages.

13. The converter of claim 12, wherein the DC link is connected directly between the PCS and the converter, and the droop curve indicates a relationship between the voltage of the DC link and an output power of the converter.

14. The converter of claim 12, wherein the processor is further configured to:
derive an output power matching the detected DC link voltage in the droop curve;
set the derived output power as an output reference of the converter; and
control the output of the converter based on the output reference of the converter.

15. The converter of claim 12, wherein the PCS is connected to a plurality of converters including the converter, the plurality of converters being configured to perform DC-DC conversion respectively between the PCS and the plurality of batteries including the battery,
wherein the plurality of converters respectively store information on a plurality of droop curves, including the droop curve, the droop curves having different slopes from each other, and
wherein charging or discharging is completed at a DC link voltage at which a sum of the outputs of the plurality of converters connected to the PCS matches a power of the PCS, thereby maintaining balance.

16. The converter of claim 12, wherein a slope of the droop curve for the battery is set based on a state of the battery, and the droop curve includes information on a maximum charge power and a maximum discharge power.

17. An energy storage system, comprising:
 a plurality of battery racks;
 a plurality of converters each configured to perform DC-DC conversion for a corresponding one of the plurality of battery racks;
 a power conversion system connected between the plurality of converters and a power grid; and
 a battery section controller configured to determine a plurality of droop curves for controlling outputs of the converters according to states of the battery racks, respectively, the droop curves having different slopes from each other,
 wherein each converter among the plurality of converters is configured to:
  receive and store information on a corresponding one of the droop curves determined by the battery section controller,
  detect a voltage change in a DC link between the power conversion system and the converter, the voltage change being caused by a start of a charging or a discharging operation, and
  control an output of the converter based on a detected DC link voltage and the corresponding droop curve.

18. The energy storage system of claim 17, wherein at least one of the droop curves includes a dead band in which neither charging nor discharging is performed for an adjustable range of DC link voltages.

19. The energy storage system of claim 17, wherein:
 the DC link is connected directly between the power conversion system and the plurality of converters; and
 the plurality of converters are connected to each other in parallel.

20. The energy storage system of claim 17, wherein the battery section controller is in communication with the plurality of converters via a controller area network or Ethernet.

* * * * *